April 4, 1961  P. BOONE  2,977,845
DISPLAY SYSTEMS, DEVICES AND PRODUCTS
EMPLOYING POLARIZED LIGHT
Filed Oct. 14, 1955
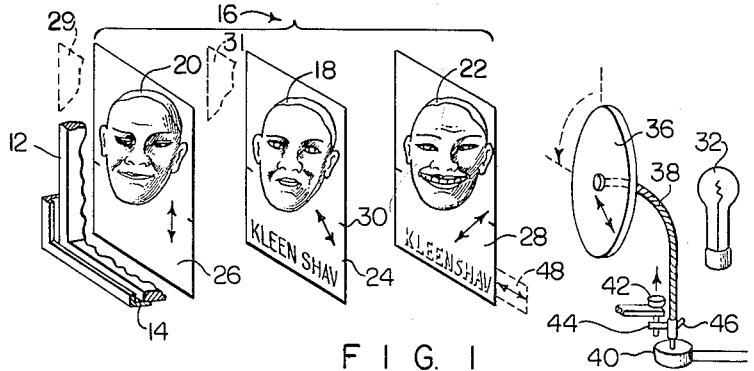
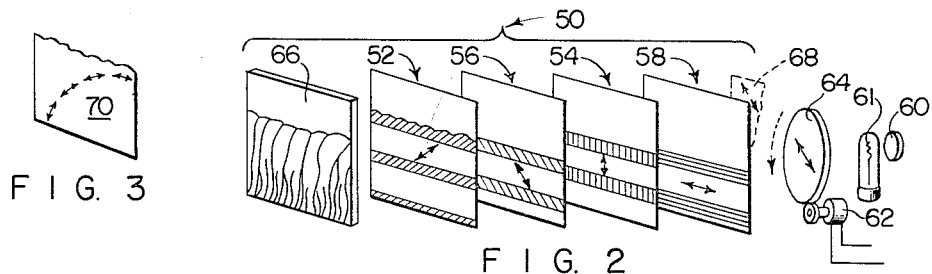
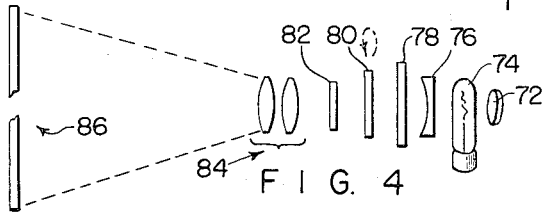
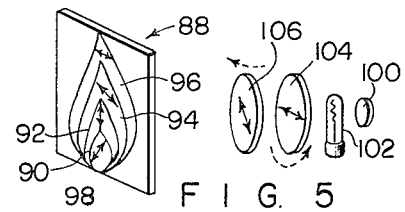
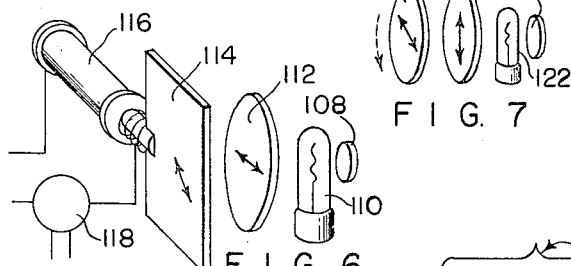
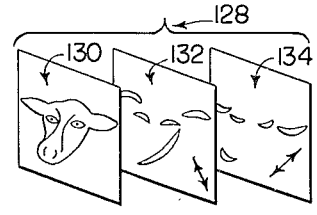
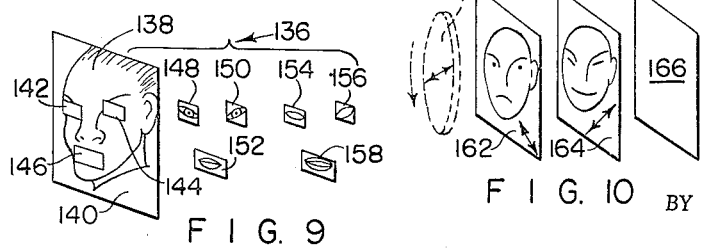
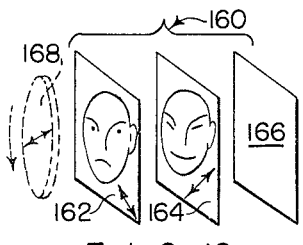
INVENTOR.
BY Philip Boone United States Patent Office 2,977,845
Patented Apr. 4, 1961

2,977,845
DISPLAY SYSTEMS, DEVICES, AND PRODUCTS EMPLOYING POLARIZED LIGHT
Philip Boone, 15 Fenwick Road, Winchester, Mass.
Filed Oct. 14, 1955, Ser. No. 540,460
19 Claims. (Cl. 88—24)

This invention relates to improvements in display systems, devices and products which employ polarized light and to methods relating thereto.

An object of the invention is to provide a new and relatively simple method of producing motion pictures, primarily for display purposes.

Another object of the invention is to provide a display system in which a plurality of light polarizing images and a source of controlled polarized light are employed to produce a motion picture, without the requirements of moving frames of film, a shutter, the usual intermittent movement or other conventional means used in motion picture projection.

A further object of the invention is to provide a display system of the character described which can readily be manufactured on a production basis at a reasonable cost.

Still another object of the invention is to provide a display system of the character described employing light polarizing images which can be produced through established photographic and printing methods and easily performed modifications thereof, on a large-scale economical basis.

A still further object of the invention is to provide a display representation or assembly in such forms as a transparency, a reflection print or a projected image; in black and white or color; in line, half-tone or continuous tone form.

Another object of the invention is to provide a display representation of the character described in which light polarizing images and nonpolarizing images are employed in coacting and complementing relation.

A further object of the invention is to provide systems of the character described in such form and size as may be adapted to use as a window display, a counter display, a sign, or for decorative, instructional or other uses.

Still another object of the invention is to provide a display representation of the character described which has a satisfactory appearance when not operated as an animated display and when illuminated by normal light such as daylight.

A still further object of the invention is to provide suitable sources of controlled polarized light for use in systems of the invention.

These and other objects of the invention will be apparent from the following description taken in conjunction with the accompanying drawings wherein like reference characters refer to like parts throughout the several views in which:

Figure 1 is a partially-exploded diagrammatic view in perspective of a display system of the invention in which a plurality of light polarizing images arranged in a given order are illuminated from the rear by a controlled source of polarized light;

Fig. 2 is a partially-exploded diagrammatic view in perspective of a display system of the invention in which a plurality of light polarizing images and a coacting non-polarizing image are illuminated from the rear by a controlled source of polarized light;

Fig. 3 is a diagrammatic view of a light polarizing means which can be substituted for the light polarizing images of Fig. 2;

Fig. 4 is a diagrammatic view in side elevation of a display system for projecting animated image representations on a viewing screen;

Fig. 5 is a diagrammatic view in perspective of a system in which a plurality of light polarizing images provide animation in color;

Fig. 6 is a diagrammatic view in perspective of a light source for use in a system of the invention;

Fig. 7 is a diagrammatic side view of another controlled polarized light source for use in a system of the invention;

Figs. 8 and 9 are exploded diagrammatic views in perspective of a plurality of light transmitting images suitable for use in systems of the invention; and Fig. 10 is an exploded side view in perspective of a reflection type of image assembly suitable for use with a variable light polarizer or in varying polarized light.

The present invention contemplates a new and improved method of producing motion pictures for display or other purposes where continuous, trouble-free, relatively inexpensive operation is of importance. Motion pictures of the type described herein may, in certain instances, closely resemble those produced by conventional motion picture film and projector means, although the range of animation is necessarily limited. On the other hand, they may differ somewhat in appearance from the usual motion picture depending upon which of several possible constructions of the invention are employed. As is well known, animation is highly regarded and widely used for display purposes, the usual method being to employ mechanical means or controlled lighting for obtaining the desired effects. The motion picture is visually adapted to extensive use in the display field, however, the initial cost of projection apparatus, the necessity of adjustments and maintenance, and the limited life of motion picture film all operate against its wide use for display purposes, where continuous, trouble-free operation, at reasonable expense is essential.

The present invention eliminates the foregoing disadvantages by employing, basically, a compact image assembly and a small moving element for controlling polarized light to produce moving pictures of excellent and arresting quality. Principal features are the use of animation sequence polarizing images, animation polarizing images in the form of half-tones and continuous tones, and photographic and printing methods adapted to volume production.

Figure 1 represents a display system illuminated from the rear, suitable for use in a store window, building interior, as part of a larger sign etc. A light-shielding cabinet 12 has a slot 14 in which a display representation or assembly 16, shown in exploded form, may be mounted. Display assembly 16 is composed of images 18, 20 and 22, each formed in a carrying film 24, 26 and 28, respectively. The carrying film may appropriately be formed of an oriented plastic material such as a stretched film of polyvinyl alcohol. The images may be formed in the film by using matrices, engraved plates, lithography or some other printing method and a suitable dichroic dye, ink or stain. Vibration directions of the various films are indicated by the double-headed arrows, said arrows also indicating the polarizing directions of images formed in the sheets of film. Images 18, 20 and 22 are light polarizing images having the indicated polarizing directions. These images may be in the form of line drawings, half-tones or continuous tones depending upon subject material and printing methods. The images may, for example, be formed by printing them directly on an oriented undyed sheet; by printing them in the form of a resist on a dichroic dyed sheet and destroying the dichroism of image surrounding areas; by applying a resist to image surrounding areas and imbibing the sheet in a dichroic dye. One or more supporting sheets may be required for the film which carries polarizing images. A sheet of transparent plastic such as cellulose acetate or a sheet of glass may be employed for the purpose to which one or more of the films 24, 26 and 28 may be bonded.

Although films 24, 26 and 28 are shown in exploded relation, it is to be understood that as elements of a system or as products of the present invention they are assembled in superposed or overlying relation, as by aligning registration marks 30, and that they may preferably be bonded together. An effect of progressive movement of the features of the subject in the image sequence 18, 20, 22 is provided by the differences in the appearance of the features in conjunction with progressive angular differences between the polarizing directions of the images and a given variation of the polarizing direction of polarized light incident upon the images. Fig. 1 illustrates a progressive difference between images of 45° in polarizing direction which is identified with a given offset relation of an object in different images and with progressive rotation of the vibration direction of incident polarized light which is shown as totaling 90° for a reciprocating rotational type of movement.

A diffusing layer 29 may be positioned at, or coated on, the front surface for improved viewing. Alternatively, layer 29 may be deleted and a diffusing and/or partially reflecting layer 31 having, for example, the diffusing properties of commercial grade ground glass or of matte acetate or a suitable partially reflecting material may be positioned elsewhere between the images and element 36 without visibly impairing the polarization characteristics of incident light. The advantage of the position at which element 31 is shown is that only image 20 would be clearly visible when the images were not illuminated from the rear. For example, with bright light falling on the front surface of the assembly, image 20 would be visible and images 18 and 22 would be effectively blocked out. This would be desirable under certain conditions of front surface lighting or if breakdown of the rear lighting means should occur. It is to be noted that the illustrative advertising message "kleen shav" is also formed in a polarizing dye or ink in sheet 24 and a shading replica is similarly formed in sheet 28.

A controlled source of polarized light consists of light bulb 32, reflector 34, rotatable light polarizing disk or filter 36 driven by electric motor 40 through flexible shaft 38. Motor 40 may appropriately be of a type which automatically reverses its direction of rotation when physically stopped from rotating in a given direction. An adjustable stop 42 is adapted to engage limit stops 44 and 46 of the motor shaft at the "in" position shown. Accordingly, the control polarizer 36 rotates back and forth through an angle of 90°, as shown. When stop or detent 42 is released, motor 40 and connected filter 36 will rotate continuously, the direction also being controlled by element 42. In the operational condition of the system illustrated in Fig. 1, image 22 is visible and images 20 and 18 will successively be rendered visible, one image gaining in visibility as its predecessor fades out thus producing an effect of continuous motion, it being understood in the example shown that a 90° angular relation of the polarizing direction of polarizer 36 and that of any of the images produces maximum definition of the image and parallelism between said directions produces substantially invisibility of the image, assuming properly chosen image densities, suitable polarizing dyes and inks, etc. A slight pause in the visible motion occurs when motor 40 reverses its direction of rotation, the images then appearing in reverse order. The illustrative advertising message "kleen shav" and its shading replica alternately appear and disappear. By placing a birefringent panel 48 of suitable birefrigence and with a properly oriented axis or principal direction in superposed relation with the trade name, as indicated, the trade name will be visible in changing interference colors.

Where an odd number of polarizing images is used, as shown in Fig. 1, it may be considered advantageous to provide an oscillating movement of the vibration direction of polarized rays from the light source. This would prevent the jumpy effect which would occur if image 18 followed image 22, or vice versa, at the end of each cycle, a condition which would exist with continuous rotation of filter 36 in a given direction. An oscillating control polarizer may also be used with other image assemblies, for example, a two-image assembly, although it has no advantage in such an instance. The adjustable detent 42 permits a choice of continuous or oscillating movement of the polarizer.

It is to be understood that extreme care must be exercised in the choice of image subject material. The images of a given sequence should possess sufficient differences both of subject matter and vibration directions to produce clearly perceptible motion, yet the motion should be smooth and have a natural quality. A proper balance of image densities is of great importance in obtaining realistic animation. A careful choice of image densities is also necessary to insure that adequate polarization of light is maintained after it has passed through several image areas to that image area which is most remote from the light source. Intermediate images may advantageously have lower densities than those depicting the beginning and end of a movement sequence as they represent a transitional phase of the sequence which, apparently, is accorded less concentration on the part of the viewer.

The images may be in black and white or in color, as described below. Addition of a fourth polarizing image to the assembly of Fig. 1, similar to image 20 in subject matter but having a horizontal polarizing direction, would serve to balance image 20 in the image forming and fading process and would provide a desirable transitional image whereby polarizer 36 could be continuously rotated in one direction. The system of Fig. 1 is thus adapted to accommodate more images than shown and it is also operative with a two-image assembly. Factors such as the complexity of the animation, required smoothness of movement, permissible cumulative densities, etc. influence the number of images which can be employed.

Fig. 2 illustrates a system in which an assembly of images 50 comprising a plurality of band-like polarizing images 52, 54, 56 and 58 are employed. The images have progressively varying polarizing directions indicated by the double-headed arrows and directions of shade lines. They are employed in combination with a source of polarized light comprising reflector 60, light source 61, motor and pulley 62 providing rotation of light polarizer 64 continuously in a given direction, and a conventional picture 66, i.e. a light transmitting photograph of a waterfall, preferably in full color and having a diffusing carrier for the image. Image elements 52, 54, 56 and 58 are formed in any of the ways described relative to the polarizing images of Fig. 1. In the system of Fig. 2, as well as in other assemblies described herein, it will be apparent that areas of the films which are undyed and nonpolarizing may consist merely of clear highly oriented or partially polarizing areas which because of their superposed relation with other similar areas have acquired or assume special retardation or birefringent properties. Care must be exercised when such areas are contiguous or precede a polarizing image in the path of light to insure that no cumulative properties of the aforesaid nature are present which might disrupt the intended operation of the system. The areas could be rendered isotropic or effectively so by providing the crossed axes of adjacent layers shown. On the other hand, the areas might be employed to alter image motion, provide special color effects or serve some other useful purpose. It will be noted in Fig. 2 that, unlike Fig. 1, no two polarizing images will be superposed when the films are assembled. In operation, the system produces downwardly moving bands of shadow and light which are incident upon the rear of image 66 and which cause the waterfall to appear as if in motion. The area of the picture above the waterfall remains static. It will be apparent that only a given relative orientation of the polarizing images and rotation of the polarizer 64 in a given direction will produce a correct effect of motion, an operative relation of components being shown in the illustration. In general, polarizing images of somewhat low density may be preferred for this type of system as the effect must be somewhat subtle for best results. Factors such as intensity of the light source, proximity of the polarizing images to the rear surface of image 66, the amount of light, i.e. extraneous light, incident upon the front surface of image 66, etc. would have a bearing upon the selected densities of the polarizing images. The system of Fig. 2 is particularly adapted to creating effects of flowing water or other liquids, moving smoke, clouds, fire, rain and backgrounds. Various configurations of the polarizing images would be best adapted to produce such effects, the bands shown being merely illustrative. A birefringent element 68 coextensive with the image area could be positioned as indicated to provide changing interference color effects in the image areas, it being necessary to select an element having a birefringence value which is compatible with intended motion effects and desired color.

Fig. 3 illustrates a single light polarizing image area 70 which is functionally similar to combined images 52, 54, 56 and 58 of Fig. 2. It is a light polarizer having a continuously changing vibration direction indicated by the double-headed arrows. Using this type of polarizer, various configurations, differing from the bands of Fig. 2, could be formed as, for example, by rendering only exposed surface portions in the form of a pattern light polarizing while masking other surface portions.

In Fig. 4 a projection system is illustrated consisting of reflector 72, light source 74, condenser 76, heat shield 78, variable light polarizing means 80, transparency 82 comprising a sequence of animation-producing light polarizing images, objective 84 and screen or other nonpolarizing surface 86. Element 86 may be considered as of an opaque reflecting type but it could be translucent for viewing images on the side remote from the incident image-forming rays. Polarizer 80 may be any of the types described herein for producing polarized beams having a changing polarizing direction, actuating means therefor being omitted, or it could be a combination of polarizing and retardation means, shown elsewhere herein. Element 82 may be any of the composite images described herein, in the form of a slide for mounting in a projector.

Fig. 5 represents a display system in which a composite image element 88 representing a flame is formed of offset or laterally displaced images 90, 92, 94 and 96 having polarizing directions of progressively different orientation, as described relative to Figs. 1 and 2 or, in modified form in Fig. 3. Alternatively, the images could be preformed areas of light polarizing material butted together and mounted on a support, preferably light diffusing. A variable polarizing light source comprises reflector 100, light bulb 102, light polarizer 104 and birefringent element 106. Element 104 may be fixed and element 106 be movable, or vice versa, or both elements may be movable. Tilting element 106 with respect to the optical axis of the system alters its effective thickness and hence its birefringence. Rotating element 106 alters a principal direction thereof and, accordingly, its birefringence. The system is capable of producing the effect of a flickering flame in brilliant interference colors. Actuating means for elements 104 and 106 are omitted as they could be similar to those described elsewhere herein. It will be apparent that a solenoid or a cam engaging means associated with rotating element 104 could be used for tilting element 106. Other composite images of a similar general type could be employed in the system such as geometric patterns formed of a plurality of light polarizing images.

Fig. 6 illustrates an alternate means for providing a controlled change of the vibration direction (polarizing direction) of polarized light which may be used in various systems of the invention. It consists of reflector 108, light bulb 110, light polarizer 112 having a polarizing direction indicated by the double-headed arrow, half-wave retardation plate 114 having a principal direction indicated by the double-headed arrow, said plate being moved into and removed from the path of light by solenoid 116 and timer 118. Timer 118 provides timed pulses to the coil of solenoid 116. It is to be understood that timers may also be employed with other control polarizing or retardation elements shown herein for providing pauses between animation sequences and the like. Assuming the polarizing direction of polarizer 112 to be crossed with that of one of a pair of polarizing images such as shown in the following illustrations and having a preferably 90° relative orientation, to render the image visible, introduction of plate 114 into the path of light would provide a 90° rotation of the polarizing direction of light emanating from element 112, disappearance of the first image and appearance of the second image. Plate 114 could incorporate additional sections having different retardation properties so as to be suitable for use with more than two polarizing images.

Fig. 7 illustrates another controlled polarized light source which is generally similar to that of Fig. 6 except that the retardation element is differently operated. The assembly comprises reflector 120, light bulb 122, fixed light polarizer 124 and movable retardation element 126, i.e. a half-wave plate. This type of light source could, for example, be used in the systems of Figs. 1 and 4 and with the image assemblies of Figs. 8 and 9 to provide polarized light rays having a controlled progressive change of polarizing direction. Element 126 is shown as being adapted to either rotation or tilting in the path of light, actuating means being similar to that described elsewhere herein.

Figs. 8 and 9 illustrate combinations of light polarizing image portions with nonpolarizing image portions. Fig. 8 shows an image sequence or series 128 comprising a conventional image 130, i.e. a cow's head in full color on a diffusing background, and polarizing images 132 and 134 having polarizing directions indicated by the double-headed arrows. The polarizing images may be formed by any of the methods described herein. When assembled in correctly registered and superposed relation, images 132 and 134 in combination with image 130 provide the effect of the cow chewing its cud and moving its eyes and ears in a lifelike manner, when in the path of rays from controlled polarized light sources of the type described herein. In Fig. 9, the composite image comprises conventionally formed image 138 preferably in full color and printed on a preferably translucent diffusing support 140, blank areas 142, 144 and 146 which may either be cut-out areas or moderately diffusing portions of support 140, light polarizing image areas 148, 150 and 152 to be fitted into or superposed on areas 142, 144 and 146, respectively, and light polarizing image areas 154, 156 and 158 to be superposed on areas 148, 150 and 152. This assembly can be used with light sources of the type shown in Figs. 1, 2, 6 and 7 and modifications elsewhere described herein. It is to be understood that images 148, 150 and 152 have polarizing directions disposed at approximately 90° with respect to polarizing directions of images 154, 156 and 158, the first-named three images having one given direction of polarization and the last-named three images also having one given polarizing direction, and that the images are formed by any of the methods described herein. The constructions of Figs. 8 and 9 illustrate particularly easy and economical means and methods providing motion picture effects where the overall display representation is of large dimensions, the major image area being formed by conventional printing procedures and only minor areas being formed of light polarizing images bonded or otherwise affixed to areas overlying or abutting the major image area.

Fig. 10 illustrates an image assembly of a type hereinbefore described but with means for viewing in reflected light. The assembly 160 comprises light polarizing image elements 162 and 164 having polarizing directions indicated by the double-headed arrows and nondepolarizing reflecting element 166. The assembly may constitute a reflection print to be viewed through a rotatable polarizer 168 under normal light or the assembly 160 may be positioned in the path of controlled polarized light sources of the type described elsewhere herein. Images 162 and 164 are formed by methods hereinbefore explained and may be augmented by additional images illustrated in the other figures. By omitting the diffusing elements described, by positioning image areas in front of the reflecting element 166, and by projecting controlled polarized light from sources of the type shown herein onto the surface of the image nearest the light source, any of the means set forth herein may be used in reflection systems. Assuming identical image assemblies, a given direction of movement of a vibration direction of the controlled polarized light source will produce an opposite animation sequence in a reflection system to that of a transmission system.

Several means for varying the polarizing direction of polarized light incident upon the images have been described herein. Certain advantages or disadvantages will be apparent in the use of one type or another with the variations of image structure, the choice being determined by such factors as best animation effect, design of a display unit, cost, etc. Other means for providing or controlling polarized light which might be employed are a Kerr cell or a rotatable polarizing element having vanes which is caused to rotate by heat from a light bulb or other heat producing element.

One basic method of forming a composite image assembly of the invention comprises the following steps: preparing and photographing suitable subject material, namely, objects in motion or posed in positions simulating a motion sequence, with especial care to backgrounds with permit maximum latitude of offset relation between images; preparing film positives and negatives; inspecting positives and selecting images which together will produce a satisfactory animation sequence; using negatives corresponding to positives and exposing matrix film through negatives using extreme care to obtain necessary balance of density and contrast in matrices; identifying each matrix for its proper order in the animation sequence and imbibing the matrices in a dichroic fluid such as a dye or stain; forming light polarizing images of the subject material by compressing each matrix with a film material having a molecular orientation in a given direction; processing the printed images for permanence; aligning the prints for register or offset of image parts to obtain best animation relation; assembling into a unitary form with nonpolarizing and diffusing elements, as required. In place of the steps, above, relating to the use of matrix film, line or half tone plates could be made from the original photographs and a dichroic ink used in printing or a lithographic method employed. Supplementary steps could include an advertising message in the original subject material or added to film; retouching image areas for accentuating animation effects, modifying backgrounds, etc.; providing images in color; laminating image carrying films, etc.

The light polarizing images may be formed in color by any known method or special adaptation thereof. For example, a given image or selected portion may be formed in a sheet of polyvinyl alcohol which has been stretched to acquire a desired molecular orientation by printing the image, as above described, using a colored dichroic fluid of a type which acts to absorb a portion of one component of light of a relatively narrow wavelength band within the visible spectrum. Such a dye could be used, for example, to form a red image of the mouth, tinted fingernails, a lipstick, etc. at different positions of an animation sequence. Two and three color light polarizing images can be made by adapting a color process such as that described in the Land Patent 2,289,714 to animation sequence images of the invention. Depending upon the subject material of the display, one or more of the polarizing images can be tinted or overprinted with a transparent isotropic paint or dye where retention of color will not interfere with the animation effect as, for example, at a parallel relation of vibration directions of control polarizer and polarizing image in an area having the isotropic color material.

Where areas surrounding light polarizing image areas have generally been described as light transmitting herein, such areas may be opaque and in certain types of displays opaque areas may be desirable or essential to the intended effect. Advertising messages have been omitted from most of the examples presented herein. However, it will be understood that they would generally be included in a display used for advertising purposes and might be in the form described relative to Fig. 1, in the form of opaque or translucent lettering or of any other type.

In describing conditions which cause visibility and invisibility it has generally been implied that the image becomes fully visible at a 90° relation, namely, at the "extinction" relation, of the vibration direction of the control polarizer and that of the image. While this is the general condition, it is possible that certain images or parts of images may be rendered functionally visible at a parallel relation of these vibration directions as, for example, when the display involves an image against a dark surround. To minimize double imaging at crossed and parallel relations of control polarizer and image vibration directions dichroic fluids should be employed which show a minimum absorption for the transmitted components of light. Circular polarizers, as well as plane, can be employed herein.

An alternative method of forming light polarizing images can be adapted to forming the animation sequence light polarizing images employed in systems and assemblies described herein. This process involves provision of a pair of such images in a single oriented film by using dichroic fluids such as dyes, stains or inks of opposite sign, namely, those exhibiting positive dichroism for one image and negative dichroism for a second image. Accordingly, images shown herein having a 90° relative orientation of vibration directions and printed on separate films could be printed on a single film by employing this method of image formation.

Various intermittent devices, in addition to those shown, may be employed for producing a wide variety of animation effects through various movements of the control polarizer or retardation element. Such devices, driven by a motor, solenoid etc., may comprise cams, gears, sector gears, ratchets, pulleys, shafts and levers. Using a sector gear on the motor shaft and a meshing full gear on the extremity of the flexible shaft of Fig. 1, the following animation sequences could be produced: images 18, 20 and 22 would successively appear followed by a pause; images 18, 20 and 22 would successively appear followed by a short pause and by images 20 and 18 followed by a longer pause. Variable speed devices could also be employed to produce further movement effects. A plurality of synchronized polarized light sources could be used for large display areas having widely spaced light polarizing image areas. Small retardation plates differently located in the path of polarized light and focused on different parts of a light polarizing image, when moved as described herein, could be used to provide still further animation effects. The retardation element 114 of Fig. 6 could be a sectionalized polarizer, each section having a different vibration direction for achieving a similar result to that of a multi-section retardation element.

While certain polarizing directions have been indicated in the illustrations, other directions may be employed. For example, three images oriented at 60° angles might be employed. A larger number of images oriented at less than 45° angles might also be used, images having a sharper cutoff or lower density, or both, being suitable.

In selecting frames from a motion picture sequence for ultimate use as light polarizing images of the invention it may be necessary to employ frames which are spaced apart by several intervening frames to produce sufficient animation in the polarizing image sequence. To obtain best registration of image portions to be retained for representing motion, it may be necessary to alter or delete background portions or even to render a surrounding portion isotropic or remove the surround and substitute another material.

Although the systems shown herein have structural and functional differences, all basically comprise a plurality of light polarizing images coacting to produce animation sequences and controlled polarized light sources coacting with the images to provide visible animation or motion pictures. The composite image assemblies all have the common property of reacting to controlled polarized light sources to produce a similar result, namely, animation, although structural differences of the assemblies exist. Only such differences are emphasized herein as are deemed of importance because of novel effects which they produce.

Other modifications of the systems, products and methods disclosed herein will be apparent. The examples presented are thus to be regarded as illustrative and the invention may be otherwise embodied and practiced within the scope of the following claims.

I claim:

1. A system employing polarized light for providing an animated image, said system comprising a light source for projecting light rays along an optical axis of said system, optically anisotropic filter means positioned on said optical axis in the path of said light rays, adjustable means for varying the position and, accordingly, the anisotropic characteristics of said anisotropic filter means, an assembly comprising a plurality of superimposed light-transmitting layers positioned on said optical axis in said path of light rays and at least three light-polarizing images, each printed on an individual surface of said layers, said images having relatively different light-polarizing directions and each of said images being formed of a dichroic material and providing sequentially one visible image component of an animation sequence of images when its light-polarizing direction is properly oriented with respect to a principal direction of said anisotropic filter means during variation of the anisotropic characteristics of the latter.

2. A system, as defined in claim 1, wherein at least one of said light-transmitting layers comprises birefringent material.

3. A system, as defined in claim 1, wherein a layer bearing an optically isotropic image is superimposed with said light-transmitting layers, said anisotropic filter means and images serving as animation components relative to said isotropic image.

4. A system, as defined in claim 1, which includes an objective and a projection screen in the path of said light rays, said assembly being in the form of a composite transparency positioned between said light source and objective.

5. A composite multilayer film adapted to provide a composite animated image when positioned in a path of polarized light which is undergoing variation of its polarization characteristics, said film comprising an assembly of superimposed birefringent light-transmitting layers and at least three light-polarizing printed images having relatively different polarizing directions formed in individual layers of said assembly, each image being different from another but forming a part of an animation sequence.

6. A multilayer film, as defined in claim 5, wherein a light-reflecting layer is included in superimposed relation with said light-transmitting layers.

7. A multilayer film, as defined in claim 5, wherein light-diffusing means is incorporated with at least one layer thereof.

8. A multilayer film, as defined in claim 5, wherein is included color-providing means for rendering said images in color.

9. A multilayer film, as defined in claim 5, wherein at least two of said light-polarizing images are rendered in relatively different optical densities.

10. A multilayer film, as defined in claim 5, wherein said layers in which said images are formed are composed of a molecularly oriented hydroxyl-containing vinyl polymer, and wherein said light-polarizing images are rendered in a dichroic substance.

11. A multilayer film, as defined in claim 5, wherein a plurality of isotropic color-providing substances are superimposed with said light-polarizing images for rendering said images multicolored.

12. A multilayer film, as defined in claim 5, wherein a layer superimposed with one of said layers bears an isotropic image adapted to exhibit animation in cooperation with said anisotropic images.

13. A multilayer film, as defined in claim 5, wherein said superimposed layers are at least in part bonded together to form an integral assembly.

14. A composite multilayer film adapted to provide a sequence of at least three different visible images when positioned in a path of polarized light which is undergoing modification of its polarization characteristics, said film comprising an assembly of a plurality of superimposed substantially light-transmitting sheets including at least three birefringent sheets having at least three relatively differentially light-polarizing dichroic dye images formed in surface portions thereof, the orientation of at least a pair of said sheets having axes of birefringence crossed substantially at 90° whereby disturbing birefringent effects of adjacent sheets may be rendered substantially ineffective.

15. A composite multilayer and multi-image film adapted to have one of its images rendered visible and another of its images rendered substantially invisible when viewed in normal light, said film comprising a plurality of superimposed light-transmitting layers, at least two substantially superimposed light-polarizing images having relatively different light-polarizing directions formed within said layers, and a light-modifying layer superimposed with and interposed between said light-polarizing images for rendering substantially only the foremost of said two images which is nearest the viewer visible in normal unpolarized light incident on the front surface of said multilayer film, said light being substantially reflected from said light-modifying layer to said viewer.

16. A composite multilayer and multi-image film, as defined in claim 15, wherein said light-modifying layer comprises a light-diffusing material.

17. A composite multilayer and multi-image film, as defined in claim 15, wherein said light-modifying layer comprises a partially light-reflecting material.

18. A composite multilayer and multi-image film, as defined in claim 15, wherein said light-modifying layer comprises both light-diffusing and partially light-reflecting material.

19. A composite film, as defined in claim 15, wherein both of said light-polarizing images and said light-modifying layer substantially transmit light incident on the rear surface of said film.

References Cited in the file of this patent

UNITED STATES PATENTS

| | | |
|---|---|---|
| 1,034,833 | Previn | Aug. 6, 1912 |
| 1,260,221 | McCormick | Mar. 19, 1918 |
| 1,610,423 | Cawley | Dec. 14, 1926 |
| 1,759,777 | Cawley | May 20, 1930 |
| 1,879,793 | Chubb | Sept. 27, 1932 |
| 1,967,161 | Simon | July 17, 1934 |
| 2,018,214 | Land | Oct. 22, 1935 |
| 2,070,787 | Frocht | Feb. 16, 1937 |
| 2,158,129 | Land | May 16, 1939 |
| 2,165,974 | Land | July 11, 1939 |
| 2,184,138 | Corey | Dec. 19, 1939 |
| 2,210,333 | Kroner | Aug. 6, 1940 |
| 2,263,684 | Ryan | Nov. 25, 1941 |
| 2,289,714 | Land | July 14, 1942 |
| 2,329,543 | Land | Sept. 14, 1943 |
| 2,393,968 | Burchell et al. | Feb. 5, 1946 |
| 2,473,857 | Burchell | June 21, 1949 |
| 2,488,955 | Wood | Nov. 22, 1949 |
| 2,565,185 | Pastor | Aug. 21, 1951 |
| 2,603,129 | Dreyer | July 15, 1952 |
| 2,617,329 | Dreyer | Nov. 11, 1952 |

OTHER REFERENCES

Vectographs: Images in Terms of Vectorial Inequality and Their Application in Three-Dimensional Representation, by Edwin H. Land, Journal of the Americal Optical Society, volume 30, pages 230–238, June 1940.

Vectograph Stereograms, by Beverly Dudley, Photo Technique, May 1941, pages 30–33.